United States Patent
Ng

(10) Patent No.: US 7,571,220 B1
(45) Date of Patent: Aug. 4, 2009

(54) METHOD AND SYSTEM FOR MANAGING E-MAILS

(76) Inventor: Kim Kwee Ng, 10 Malibu La., Centereach, NY (US) 11720-3042

( * ) Notice: Subject to any disclaimer, the term of this patent is extended or adjusted under 35 U.S.C. 154(b) by 0 days.

(21) Appl. No.: 12/337,570

(22) Filed: Dec. 17, 2008

(51) Int. Cl.
G06F 15/16 (2006.01)

(52) U.S. Cl. ..................... 709/219; 709/225

(58) Field of Classification Search ............ 709/206, 709/217, 219, 225
See application file for complete search history.

(56) References Cited

U.S. PATENT DOCUMENTS

| | | | |
|---|---|---|---|
| 6,167,435 A | 12/2000 | Druckenmiller | |
| 6,266,692 B1 | 7/2001 | Greenstein | |
| 6,421,709 B1 * | 7/2002 | McCormick et al. | 709/206 |
| 7,184,971 B1 | 2/2007 | Ferber | |
| 7,194,515 B2 | 3/2007 | Kirsch | |
| 7,216,233 B1 | 5/2007 | Krueger | |
| 7,428,576 B2 | 9/2008 | Shuster | |
| 7,433,924 B2 | 10/2008 | Malcolm | |
| 7,444,380 B1 | 10/2008 | Diamond | |
| 7,447,744 B2 | 11/2008 | Wallace et al. | |
| 2002/0165912 A1 * | 11/2002 | Wenocur et al. | 709/203 |
| 2003/0065941 A1 * | 4/2003 | Ballard et al. | 713/201 |
| 2004/0181581 A1 * | 9/2004 | Kosco | 709/206 |
| 2004/0186895 A1 | 9/2004 | Ellis | |
| 2005/0055410 A1 | 3/2005 | Landsman et al. | |
| 2005/0183142 A1 * | 8/2005 | Podanoffsky | 726/18 |
| 2006/0004896 A1 | 1/2006 | Nelson et al. | |
| 2006/0224678 A1 | 10/2006 | Hall | |
| 2006/0271629 A1 * | 11/2006 | MacDowell | 709/206 |
| 2007/0174448 A1 | 7/2007 | Ahuja et al. | |
| 2007/0250586 A1 | 10/2007 | Kirsch | |
| 2008/0168145 A1 | 7/2008 | Wilson | |

* cited by examiner

Primary Examiner—Jeffrey Pwu
Assistant Examiner—Scott M Sciacca

(57) ABSTRACT

A user starts with a master password which is an authorized access key for a sender on a remote mail system to send a mail. The master password is automatically replaced by an authorized-to-reply key transmitted to the remote mail system. The mail systems are using the authorized-to-reply key and the permission-to-transmit key in a two-ways communication network to exchange mails. The master password is deleted later to prevent unauthorized use, without affecting previously established mail exchanges. An unknown sender requests an authorized-to-reply key through an interactive examination. A command flag enables the user to switch between anti-spam mode and non-antispam mode, and to rebuild the authorized-to-reply key in a security-demanding environment. The authorized-to-reply key is sub-divided to comprise a unique group name to facilitate sorting and graphic displays of the various groups. A utility program searches and matches all desired services and advertisements with the offers from other mail users.

20 Claims, 3 Drawing Sheets

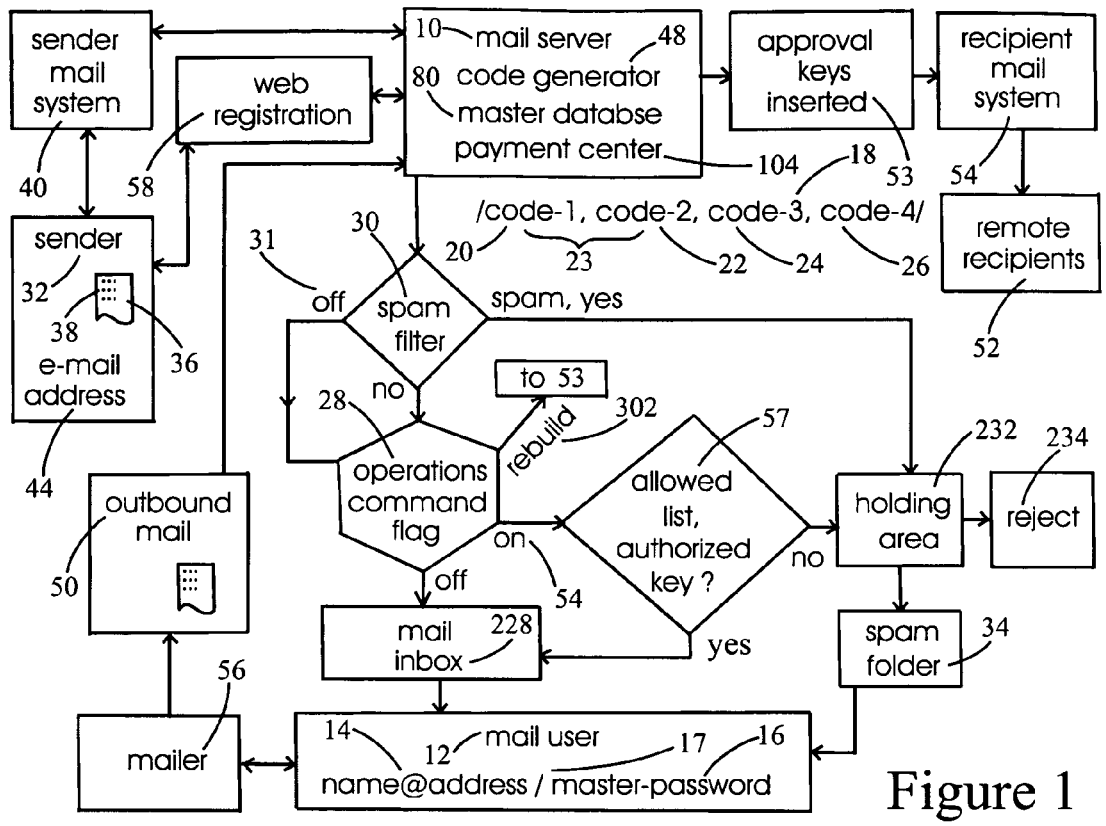
Figure 1
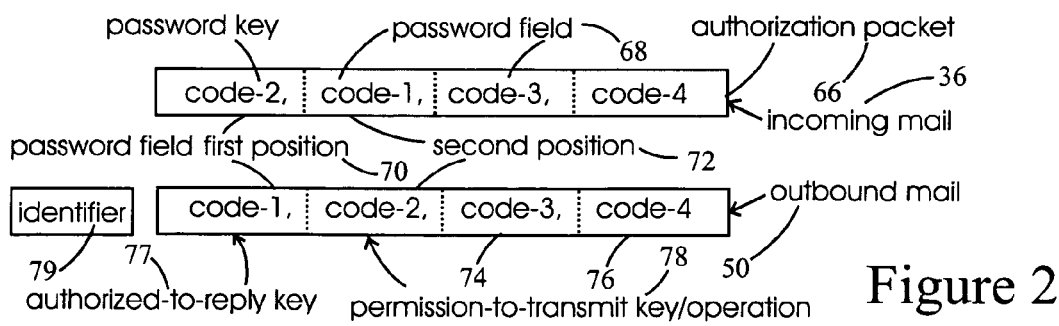
Figure 2
"John Noe /code-1, code-2/" <john.noe@zzknown.com>
"John Noe /code-1, code-2, code-3,code-4/" <john.noe@zzknown.com>
"John Noe" <code-1-code-2-john.noe@zzknown.com>
"John Noe" <code-1.code-2.john.noe@zzknown.com>
Figure 3

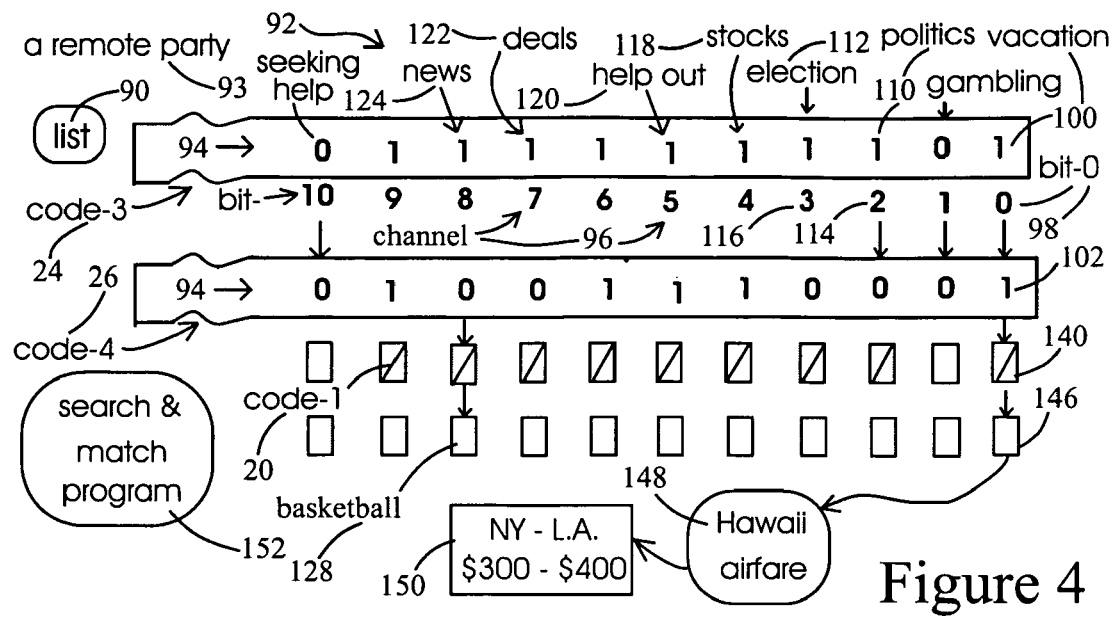
Figure 4
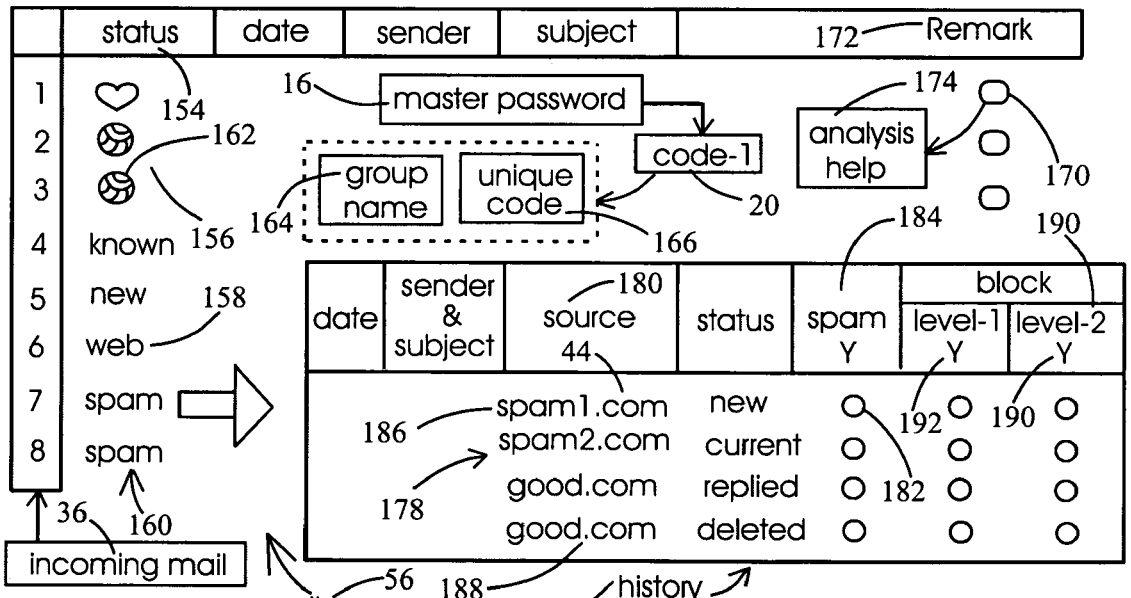
Figure 5
Figure 6

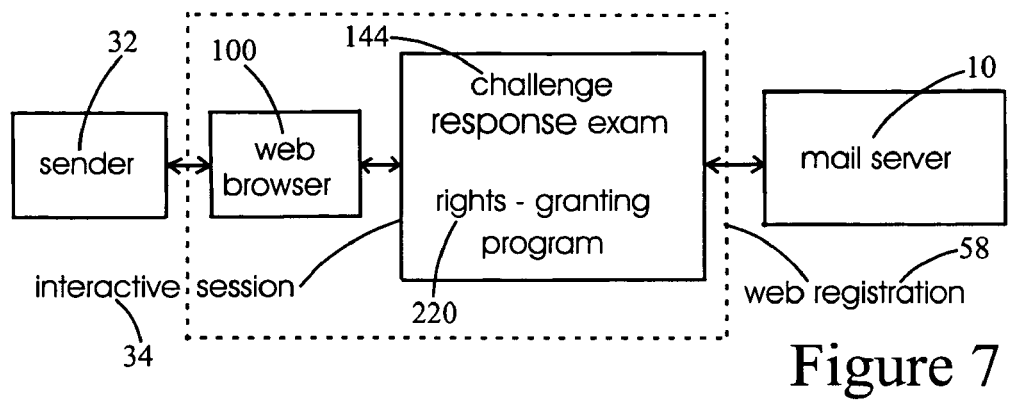
Figure 7
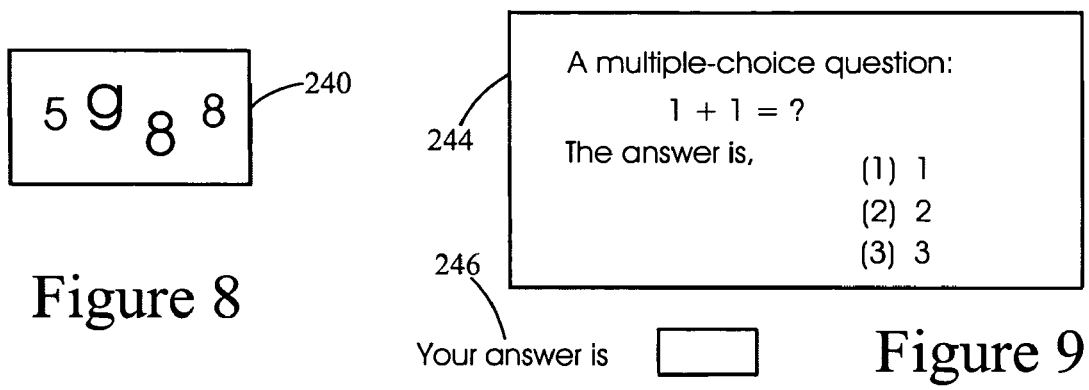
Figure 8
Figure 9
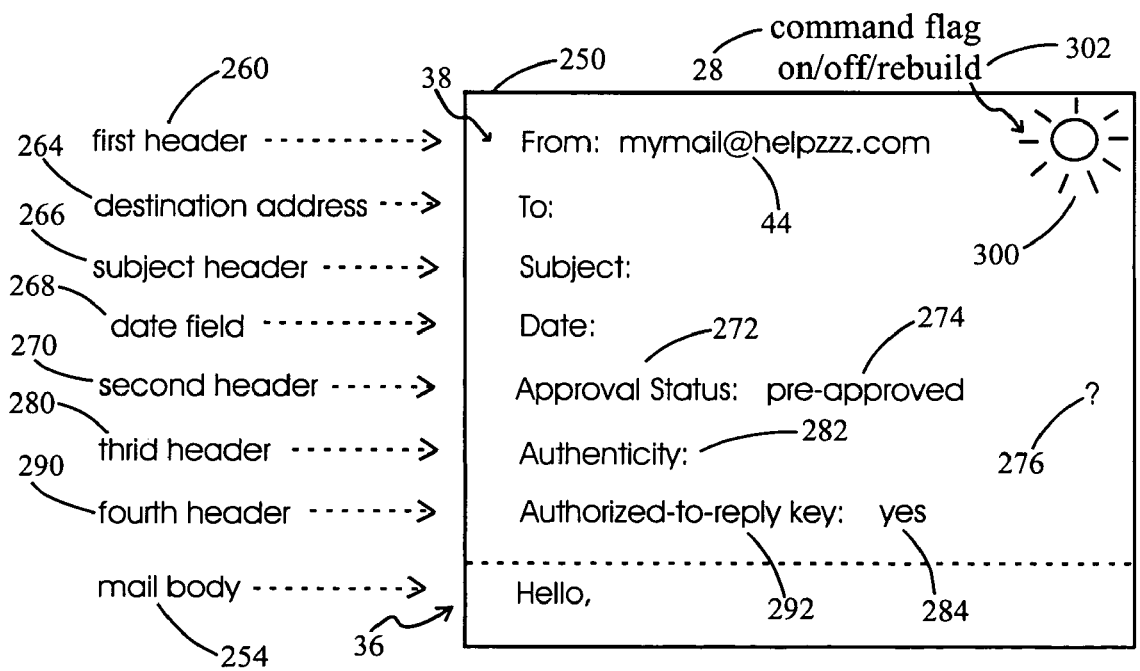
Figure 10

METHOD AND SYSTEM FOR MANAGING E-MAILS

BACKGROUND OF THE INVENTION

1. Field of the Invention

The present invention is generally related to the field of managing electronic messaging over a communication network, more particularly, a method for managing the reception of mails and filtering unsolicited and undesired (spam) mails.

2. Background of the Invention

Unsolicited spam mails have been a major problem for many mail readers, who have to spend their valuable time in reading and sorting incoming mails.

It is preferable to have a way to separate the spam mails from other useful mails and optionally block, according to the wishes of a user, other unsolicited and unauthorized bulk mails from reaching the user's mailbox.

U.S. Pat. Nos. 7,447,744 and 7,194,515, issued respectively on Nov. 4, 2008 and Mar. 20, 2007, describe a method and a system to send a follow-up challenge message to a sender in order to verify the authenticity of a previously sent mail message. After sending out the mail, the sender may have already left, or failed to immediately attend to the follow-up request for a confirmation of the mail. There is a possibility of a delay in the processing of the mail by a busy server system. The mail would often be delayed by a broken and busy Internet connection. The delay in processing a mail would sometimes make the receipt of the mail outdated. A mail may become irrelevant when it is not timely received by a user.

U.S. Pat. No. 6,266,692, issued Jul. 24, 2001, discloses a method which provides selected senders with a valid passcode, so that a mail can be delivered to a user. The passcode contained in a mail message is checked against the user's database to see if there is a match. However, other than a special case in which a sender makes a formal request to the user for a permission to send a mail, the method does not describe in detail a way for an unknown sender to obtain a valid passcode.

U.S. Pat. No. 7,216,233, issued May 8, 2007, describes a digital signature that is embedded in a mail content for transmission. An application software is used to determine the priority of the mail if a signature is present in the mail. A mail is filtered according to the asserted access levels encoded in the digital signature. A mail is delivered to a recipient having equivalent or higher access level as indicated in the digital signature of the mail.

Some of the proposed mail servers disclosed in the prior art have included a passcode key in the header of a mail. The passcode key may be inadvertently disclosed or compromised during data transmission. It is a time-consuming effort for a user to manage and reissue the passcode key to all interested individuals.

The methods proposed in the prior art devices are usually applied to a mail server at a receiving end of the mails. A two-way communicating scheme between a plurality of mail systems is preferable to overcome the limitations and problems in the prior art mail systems.

BRIEF SUMMARY OF THE INVENTION

A mail server grants a user with an account password and a master password. The master password enables a sender to send a mail. The master password is replaced by an authorized-to-reply key generated to uniquely identify the sender. The master password is deleted or modified to avoid unauthorized use.

An authorized access key at a specific position in a transmission packet is employed for a two-way mail exchange between mail systems. The permission-to-transmit key is the authorized access key to probe a targeted mail system to accept a mail. A mail server looks at a specific position in a transmission packet for a valid access key before accepting a mail. Unlike the prior art systems, two password keys, namely the authorized-to-reply code-1 key and the permission-to-transmit code-2 key, are used in a systematic and consistent way for exchanging mails between the coordinating mail systems.

A migration path is made easy when a mail user switches back and forth between an anti-spam mode and a non-antispam mode by turning on and off an operations command flag. This is useful when a large number of new senders is expected. A rebuild mode is available to regenerate at least one authorized-to-reply key in a security conscious environment.

A plurality of master passwords is assigned to different groups of senders. The subsequently generated authorized-to-reply key for replacing the master password is subdivided to contain a unique group identifier for sorting. A unique group picture for display is assigned to a specific group.

The mail server system provides a universally accessible way for an unknown sender to obtain an authorized-to-reply key through a web registration. A unique access key is given after a successful interactive challenge examination.

A utility program searches and matches a plurality of desired services and advertisements in the transmitting data packets between the mail systems. The availability of services and advertisements are contained in the code-3 key and the code-4 key. A notice is given when there is a match between an offer to provide a service and those who are seeking it.

For compatibility with the existing mail systems, various possible mail formats for inserting the password keys in a mail header are shown. The password keys may not be shown when all mail systems have adapted to the use of the password keys and the password keys are processed in the background. The password keys are generated and inserted automatically by the mail systems without a user's intervention. The modified mail header formats are useful for an unknown sender in a transitional phase, when the current mail systems do not provide an extra mail header for the insertion of the password keys.

The server categorizes a mail into different authenticity levels according to the nature of the routes the mail has taken to the sender. The mail is finally delivered to the user.

It is an object of the invention to employ uniquely define authorized access keys for exchanging mails between the mail systems. Both the authorized-to-reply password key and the permission-to-transmit password key are generated to uniquely defined for the mail sender and each of his/her intended recipients. Neither of the password keys can be used by other users. The mail systems handle all password transactions in the background, with minimum intervention required from the user.

It is an object of the invention to limit the number of spam mails while providing a reasonable access to an unknown sender who wishes to contact the user, after the sender completes a web registration and an interactive answering session.

It is an object of the invention to provide a commercial advertiser a channel to transmit preselected items of interest to the mail user. The commercial advertisements are specifically tailored to the need of the user. The mail user elects to be paid for receiving the advertisements. Furthermore, the mail user offers his/her expertise and knowledge on a variety of issues which may be of interests to other party.

It is an object of the invention to provide a display of the past history of a sender's mails, in an effort to analyze and block spam mails from spammers who have forged a known sender's mail address. The anti-spam mail server system sorts and displays user's incoming mails in a friendly and useful format in which a plurality of pictures is associated with different groups.

It is an object of the present invention to provide a way to manage a master password with ease. The master password is no longer so confidential and critical that its inadvertent disclosure would not result in some damaging consequences and the subsequent time-consuming remedy. In a normal mail processing operation, the master password is replaced by a specifically assigned access key for each individual sender in all subsequent mail operations. Moreover, the user elects to block a spam site at different domain name level and modifies or deletes the master password at will.

These and other advantages of the present invention will be apparent to those of ordinary skill in the art by referring to the accompanying drawings and the following detailed description of illustrative embodiments, wherein like reference symbols refer to the like elements of the drawings.

BRIEF DESCRIPTION OF THE DRAWINGS

FIG. 1 illustrates a flow chart of a preferred embodiment of the invention;

FIG. 2 illustrates the contents of the authorization packets as viewed by a mail server system;

FIG. 3 illustrates the entries of the password keys in the mail headers of a mail;

FIG. 4 illustrates the availability of the services and advertisements as indicated by the code-3 key and the code-4 key;

FIG. 5 illustrates the format of incoming mails received by the mail server system;

FIG. 6 illustrates the format of outbound mails from the mail server system;

FIG. 7 illustrates an interactive session initiated by a sender to acquire an authorized access key through a web browser;

FIG. 8 illustrates a pictorial image of a set of alphanumeric characters during an interactive challenge-response examination;

FIG. 9 illustrates a possible multiple-choice question to be answered by the sender in the answering box; and FIG. 10 illustrates a sample mail message comprising a plurality of mail headers and a mail body.

DETAILED DESCRIPTION OF THE INVENTION

Referring now to a preferred embodiment as shown in FIG. 1, a mail server system 10 grants a mail user 12 with an account password, together with a personalized electronic e-mail address 14 in the following format, account-name@mail-server-address/master-password 16 where the character "/" 17 is a separator.

During a mail processing operation, the internal full format for the e-mail address 14 is account-name@mail-server-address/password keys 18, where the password keys 18 comprises code-1, code-2, code-3, code-4.

For simplicity in the following illustration, the mail server system 10 sets the initial values of both the code-1 key 20 and the code-2 key 22 to "123". An authorization packet 23 comprises the code-1 key 20 and the code-2 key 22. The code-3 24 and code-4 26 are actually the data packets to be described below.

When an operations command flag 28 is turned off by the mail user 12, the mail server system accepts any code-1 key 20 from other mail systems and the master password 16 is ignored. The mail server system 10 is said to be in a non-antispam state, all incoming mails tagged with any value of code-1 key 20 are allowed. A spam filter 30 is included for adaptation with the mail system 10. A disable flag "off" 31 is provided to turn off the spam filter 30. It has been known that some of the spam filters have a tendency to place the mails sent by a new sender 32 into a spam folder 34. This is undesirable in the mail server systems.

When a mail 36 having a plurality of mail headers 38 is sent by the sender 32 from a remote mail server system 40, the mail server system 10 records the sender's e-mail address 44. After a preset period of time and the mail 36 has not been labeled as a spam mail, a code generator 48 generates a password key, called the code-1 key 20. The code-1 key 20, which comprises a plurality of random characters and numbers generated by the code generator 48, is unique and specific to the sender's e-mail address 44 and the mail user's e-mail address 14. The code-1 key 20 is issued to the remote sender's mail system 40, even if the mail 36 may have already been deleted after reading. The remote mail server system 40 records the code-1 key 20 as an authorized-to-reply key for future communication.

For each outbound mail 50 from the mail user 12, an authorized-to-reply code-1 key 20, generated by the code generator 48, is accompanying the outbound mail 50 to a remote recipient 52, via an insertion process step 53. The permission-to-transmit key, i.e. the code-2 key 22, given by a remote recipient's mail server system 54 for the permission to send the outbound mail 50 to the recipient 52, is an access key to get the remote mail server system 54 to accept the mail 50. The value of the code-2 key 22 is "123", if the remote recipient's mail server system 54 is not in an anti-spam mode.

A mailer 56, used by the user 12 to read or compose a mail, instructs the server 10 to add the names of all intended recipients specified in the outbound mail 50 to an allowed sender list 57.

After a certain period of time, the mail user 12 uses the account password to set the operations command flag 28 to an "on" state. The mail server system 10 is now said to be in an anti-spam mode. A grace period, e.g. one month, can be elected, so that a mail 36 from a new sender 32 may be accepted, with a return notice that no more mail may be accepted, except by means of a web registration 58. The anti-spam mail server system 10 is now in operation to sort and group all incoming mails 36 according to a scheme to be described below.

All mails 36 are accepted from any sender 32 who sets the authorized-to-reply code-1 key 20 to the master password 16 in the mail 36. The sender 32 also attaches his/her (sender's) permission-to-transmit code-2 key 22, in the mail 36. The code generator 48 of the mail server system 10 automatically generates a new code-1 key 20. The code-1 key 20 replaces the master password 16 in all subsequent mail exchanges with the sender 32. The new code-1 key 20 is deposited into the sender's mail server system 40. The new code-1 key 20 is also accompanying any replied mail sent from the mail user 12. Since the code-1 key 20, generated by the code generator 48, is unique and specific to the sender's e-mail address 44, other person cannot use the same code-1 key 20 to send mails to the mail user 12.

FIG. 2 shows the positions of the password keys when the mail 36 is transmitted between the mail systems. An authorization packet 66 carried in a mail 36 comprises a plurality of password keys. Each of the password keys occupies a password field 68. The positions of the password fields are identified as the first password field 70, the second password field 72, the third password field 74 and the fourth password field 76. In an outbound mail 50, the password keys are code-1 20, code-2 22, code-3 24 and code-4 26, and they are arranged consecutively in their sequential orders, occupying respectively the first password field 70, the second password field 72, the third password field 74 and the fourth password field 76.

The data residing in the first password field 70, the second password field 72, the third password field 74 and the fourth password field 76 have their distinctive functional roles. The functions of the data in their respective positions are identified as the data for an authorized-to-reply operation 77, a permission-to-transmit operation 78, code-3 data and code-4 data.

When the remote mail server system 40 delivers a replied mail 36, the positions of the password keys in the incoming replied mail 36 are different. As shown in FIG. 2, the code-1 key 20 and the code-2 key 22 in the incoming replied mail 36 sent by the remote mail server system 40 have swapped their positions, compared with those in the outbound mail 50, i.e. the two keys 20 and 22 are in a reversed order. The password keys in the password fields for an incoming replied mail 36 are in the following order, code-2 key 22, code-1 key 20, code-3 key 24 and code-4 key 26 in the authorization packet 66.

The remote mail server system 40 sends the replied mail 36, it places the code-1 key 20 (which is the authorized-to-reply key given earlier by the mail user's mail server system 10), in the second password field 72 of the authorization packet 66. The code-1 key 20, now occupying the second password field 72, becomes the permission-to-transmit key to probe the mail user's mail server system 10 to accept the replied mail 36.

Similarly, the code-2 key 22, generated and delivered by the remote mail server system 54 or 40 and occupying the first password position 70 of the authorization packet 66 in the incoming mail 36, is used later by the user's mail server system 10 as a permission-to-transmit operational key in any subsequent replied (outbound) mail 50 operation. The code-2 key 22 occupies the second password field 72 in the mail's 50 outbound operation.

During a mail processing operation, the mail server system 10 and the remote mail server system 54 or 40 are looking for a valid authorized access code residing at a specific position in the authorization packet 66 before an incoming mail is accepted. In the above example, the second password field 72 in the authorization packet 66 is selected and assigned to be a specific position containing an authorized access code for the permission to deposit a mail 36, when the authorization packet 66 is presented to a targeted mail server system.

The authorized access code is the code-2 key 22 in the outbound mail 50 sending out from the user's mail server system 10. For a replied incoming mail 36 reaching the mail server system 10 and in order for the mail system 10 to accept the mail 36, the authorized access code is the code-1 key 20 relocated to the second password field 72 of the authorization packet 66, since the code-1 key 20 has been given out earlier by the mail user 12 for a permission to contact the user 12.

It is preferable to have a consistent format for the transmission of the authorization packets 66. Other formats are possible. For example, a unique password identifier 79 is prepended before the password keys when the authorized access codes are transmitted. The position of the permission-to-transmit key depends on the prior arrangement between the coordinating mail systems 10, 54 and 40.

All the known senders 32 and recipients 52 have, at this time, been registered in a mail user's master database 80 of FIG. 1. All the required keys, the authorized-to-reply keys and the permission-to-transmit keys have been created or deposited in the mail user's mail server system 10 and the remote mail server systems 40, 54. All mail users can exchange their mails between the mail server systems without a problem. Any mail having an incorrect permission-to-transmit key 78 in the second password field 72 would be marked as "spam", and the mail is re-directed into a spam folder 34 of FIG. 1. Moreover, the spam mail may be rejected, depending upon the policy set by the mail user 12.

The mail systems are now using the two password keys, i.e. the authorized-to-reply keys and the permission-to-transmit keys in a two-way communication network for mail exchanges. The above configuration of having the two password keys for a simultaneous transmission during a mail delivery is efficient and preferable. Moreover, the password keys are not necessary to be encrypted. These non-encrypted and unsecured keys are usually sufficient, since they are specific to each mail user 12, the recipient 52 and the sender 32. Other users cannot re-use the password keys, even if the keys are intercepted by a network sniffer. A method for blocking a forged user is described below. These password keys can also be generated periodically when desired in a security conscious environment.

Some of the incoming mails 36 comprise a mail header containing a large number of addressees. The mail user 12 chooses a setting to allow the code generator 48 to generate automatically all the authorized-to-reply keys which are delivered to the remote mail server systems 40, 54. Moreover, a group key with a default temporary name group-1, group-2, etc, is assigned to the addressees.

When the mail user 12 is expecting a large number of new mail senders 32, the mail user 12 temporarily sets the operations command flag 28 to an "off" state. All mails 36 are allowed, the mail server system 10 would work quietly by generating all the required password keys when the senders 32 are admitted. A unique authorized-to-reply key for each recipient 52 is accompanying the replied mail 50 sent out by the mail user 10. The keys are also deposited into the remote mail server system 54. The password keys for the authorization to deposit a mail with the user 12 would be required when the mail user 12 turns on the operations command flag 28 again.

The master password 16, which the user 12 has earlier distributed to his/her friends, may be deleted or modified. The mail exchange between the mail server system 10 and the remote mail server system 54 or 40 remains valid, since the password keys, code-1 key 20 and code-2 key 22, rather than the master password 16, are actually used between the mail systems 10, 54 and 40.

Referring now to FIG. 3, the current mail systems are known not to have an extra header in the mail headers 38 for the entry of the password keys. The formats for the entries of the password keys, code-1 key 20 and code-2 key 22, are shown in the diagram.

The password keys 20, 22 are inserted in the name field 81 of a mail header field 82, separated from the name by a separator 17. When the functions of the code-3 key and the code-4 key are desired, it is in the form, "John Noe/code-1, code-2, code-3, code-4/"<john.noe@zzknown.com>84.

The address field of an address can be modified to include the keys, e.g. "John Noe"<code-1-code-2john.noe@zzknown.com>86, where a separator "-" 87 is used to separate the keys and the user name. Similarly, the e-mail address can be in the form, "John Noe"<code-1.code-2.john.noe@zzknown.com>88, where the name and the keys are dot-separated, i.e. " " 89.

The password keys can also be inserted into a subject field of a mail, e.g. "/code-1, code-2/,/recipient2-1, recipient2-2/", etc.

The insertion of the password keys in the mail headers 38 shown in FIG. 3 would not be needed when all mail server systems have adapted to the use of the password keys. The authorization packets are exchanged between the mail systems in the background. The formats shown in FIG. 3 are useful in a transitional phase, when other mail system is not utilizing the authorization packet 66, and the user's mail server system 10 requires the use of the authorization packet 66.

Referring now to FIG. 4, a shopping list 90 comprises a short description of the services and the commercial advertisements 92 which the mail user 12 prefers to receive. A remote interested party 93, e.g. a commercial advertiser obtains from the mail server system 10 the shopping list 90 which is built from the data residing in the code-3 key 24, the code-4 key 26 and the master database 80. Each of the code-3 key 24 and the code-4 key 26 is comprised of a plurality of 16-bits or more data bits 94. The code-3 key 24 and the code-4 key 26 are the data packets containing information on the availability of the services and the advertisements 92. Each channel 96 is assigned to an item of interest which corresponds to a data bit 94 in the data packet.

When one of the channels 96, e.g. the bit-0 98 of the code-3 key 24 which is assigned in the master database 80 to an item "vacation" 100, is set to 1, the mail user 12 indicates that he/she is interested in receiving all news and deals about the vacation 100. If the corresponding bit 102 in the code-4 key 26, i.e. the bit-0 98 of the code-4 key 26 placed directly below the code-3 key 24, is selected and turned on, as indicated by the status "1", the mail user 12 indicates that he/she prefers to be paid to read the commercial advertisement 92. The payment is made with a payment center 104 of FIG. 1 in the mail server system 10. A mail delivery right given in the form of an authorized-to-reply code-1 key 20, is granted to the advertiser 93.

FIG. 4 also indicates that the mail user 12 wishes to express his/her view on the politics 110 and the election 112 without a fee as specified in two separate channels, the bit-2 114 and bit-3 116, which are indicated by the "off" or the "0" status in the corresponding bits in the code-4 key 26. The mail user 12 is offering his/her expertise on the stock market 118 and computer software 120 for a fee whenever a service is rendered. The mail user 12 is also interested on all deals 122 and the news 124 on basketball 128.

A plurality of clickable buttons 140, which are placed immediately below the code-4 key 26 for turning on or off (disable) an action, displays either a plurality of passwords, which are the authorized-to-reply code-1 keys 20 required to reach the mail user 12, or a web-link directing the advertiser 93 to initiate a web registration 58 before contacting the user 12.

When a button 140 is pressed and a master password 16 is given out, the user's mail address 14 is likely to be abused. The web registration 58 comprising a challenge-response examination 144 of FIG. 7 to be described below, is elected by the mail user 12 to manage the issuance of the authorized-to-reply keys 20. The authorized-to-reply keys 20 are created by the code generator 48 and they are uniquely defined for each interested party 93.

A plurality of buttons 146 placed directly below the buttons 140 comprises the detailed information about the services and the advertisements 92. For example, when a button 146 placed under the channel, the bit-0 98 which is labeled as "vacation" 100, is pressed, it reveals a menu 148 displaying several items, "Hawaii" and "airfare". The menu item 148 under "airfare" is further expanded to show a table 150 about the price range and the destinations, etc. A presentation program including a shopping list 90 is built to show all available items and the keywords for easy searches. Unlike the traditional subscription service, the user 12 presents the list 90 for solicitation through mail exchanges in a user-community based search environment among a plurality of mail users for the solicitation of the services and the eventual matching of the offers from other users.

A search and service match utility program 152 is used to search, compare and list all data residing in the code-3 key and the code-4 key in the mails 36, 50. The items of interest can be defined by the user 12. However, their classifications are preferably conformed to a standardized format. The utility program 152 matches all available offers with those who are seeking the services between the mail systems. The program 152 notifies the users, when a match is found between the offer to help and the service the other is seeking, and for any other deals and advertisements available from the mail systems 10, 54 and 40.

In addition to the already given master password 16, the mail user 12 logs onto to the mail server system 10 with the above-mentioned account password and instructs the mail server system 10 to accept a plurality of new master passwords for the mail delivery. For example, the mail user 12 gives out the passwords, balls2008 and cycle2008 respectively to his/her friends in two different groups, volleyball and cycling groups.

As shown in FIG. 5, the incoming mails 36 are usually sorted in the time order the mails 36 have arrived. The mail user 12 clicks at a button 154 labeled as "status", the incoming mails 36 are sorted according to the preferences set by the mail user 12. A plurality of symbols, icons or pictures 156 and identifiers 158 are shown in the display fields 160 in the column headed by the word "status" 154. The mail user 12 assigns a picture 156 available from a table or a database 80 to a group of mails which has arrived with a designated master password key 16. If the master password 16 received is balls2008 from a friend in the volleyball group, a picture of a ball 162 is displayed in the status field 154 of the mailer 56 of FIG. 1.

To process a group's master password 16 in an efficient way, the code generator 48 creates a new code-1 password key 20, which is an authorize-to-reply key for each member of the group, when their mails 36 reach the mail server system 10 with the same designated master password 16. The new code-1 password key 20 is comprised of two components. The first component is a unique group name 164. For example, a group name, volly, is designated for the volleyball group. The second component 166, comprising a plurality of random characters and numbers, is uniquely defined and specific to the mail address of each member of the group who has sent the mail 36. All mails reaching the mail server system 10 with the same first component in the code-1 password key 20 are grouped together or deposited into a special mail folder.

If the master password 16, balls2008, is inadvertently leaked to other unauthorized persons, the mail user 12 tags the mails 36 from the unknown senders 32 as spam. The mail user 12 deletes or modifies the master password 16, balls2008, from the master database 80. All the old members in the volleyball group are not affected. They are able to continue to communicate with the mail user 12, since they are now using the authorized-to-reply code-1 keys 20, rather than the master password 16, to send mails to the mail user 12. For a better protection, the remote mail server system 40 deletes the master password 16, after the remote mail server system 40 has received the code-1 key 20, which is specific to the sender e-mail address 44 and the mail user's e-mail address 14. The deletion of the master password 16 reduces a risk that the master password 16 may be used by other un-authorized persons.

In an unfortunate event that a known sender's address book is hacked or compromised, the mail user 12 receives mails which come purportedly from the known sender 32. Someone has apparently forged the sender's e-mail address 44. The mail user 12 clicks at a button 170 in the column headed by the word "Remark" 172, a menu item 174 called "analysis" is shown. As shown in FIG. 5, the mail server system 10 displays the history 176 of the last few mails received from the sender 32, together with the domain-name 178 of the originating source 180 from which the mails 36 had actually sent.

If the mail user 12 places a mark at one of the buttons 182 labeled "Y" under the "spam" column 184, the mail server system 10 generates a new code-1 key 20 and deposits the new code-1 key 20 into the sender's mail server system 40. A notice to warn the sender about a possible security breach is sent together with the code-1 key 20 to a real, known sender 32. An option for not sending a notice may be elected by the user 12 as the mail systems are handling any new regenerated keys automatically in the background, with minimum impact to all mail users. The mail user 12 selects an option to block all mails coming from the spam sites 186. As shown in FIG. 5, the domain part of the sender's mail address 44 is comprised of several sub-domain names identifiable by domain levels separated by a dot-separator "." 188. The server mail address is of the form, sever-address.domain-2.domain-1.domain, etc. If the mail user 12 chooses to block level-2 domain 190, all mails 36 from the level-2 and above, e.g. mail.spam.com, are blocked. If the level-1 block 192 is chosen, all mails from the level-1 sites and above, e.g. spam.com, are rejected.

FIG. 6 is a simple format for displaying the status of the outbound mails 50 sent by the mail user 12. The mail user 12 takes appropriate actions as suggested by a menu item 194 called "action".

Referring now to FIG. 7, the sender 32 initiates a web registration 58 with the server 10 through a web browser 100. The mail server 10 starts an interactive challenge-response examination 144 in which the sender 32 is asked to answer a plurality of questions.

The mail server 10 verifies the answer submitted by the sender 32, and activates a rights-granting program 220 to deliver an authorized-to-reply code-1 key 20, which is specific to the sender's e-mail address, to the sender 32. The sender 32 submits the mail 36 with the authorized-to-reply key 20. The server 10 verifies the credential of the sender 32 by looking up the sender's name in the allowed sender list 57 contained in the master database 80. If the sender's name is not in the allowed sender list 57, the server 10 analyzes the mail 36 to see if the following conditions are met, (1) the data key sent by the sender 32 matches the authorized-to-reply key 20 issued and recorded in the master database 80 for this specific sender 32.

(2) the authorized-to-reply key 20 is valid within the time period specified for its usage, i.e. the authorized-to-reply key 20 has not expired.

(3) the usage of this authorized-to-reply key 20 has not exceeded a pre-set number of usage set by the user 12.

If the server 10 determines that the mail 36 satisfies the above conditions, the mail 36 is deposited into a user's inbox 228 of FIG. 1. If one of the above conditions fails, the mail 36 is marked as "spam" and is diverted into a holding area 232 of FIG. 1 for a final rejection 234. The spam mail is saved in the spam folder 34 for inspection by the mail user 12.

FIG. 8 shows a graphic picture box 240 sent by the server 10 during a challenge-response examination 144 with the sender 32. The sender 32 replies by making a matching entry, i.e. by typing a correct answer, in this case, "5g88" as shown in the picture box 240. The alphanumeric characters inside the picture box 240 are shown in different sizes and they are positioned at different locations in the picture box 240.

FIG. 9 shows one of the many challenge questions possibly provided by the server 10. The question box 244 contains a multiple-choice question. The sender enters a correct answer to the question in an answering box 246 and submits the answer to the server 10.

Referring now to FIG. 10, the mail message 36 shown inside a message box 250 comprises a plurality of mail headers 38 and a mail body 254. The first mail header 260 displays the sender's e-mail address 44. Other descriptive headers include a destination address 264, a subject header 266 and a data field 268 for the date and time stamp of the mail 36.

A second mail header 270 contains a status field 272 which is labeled as "Approval Status:" in the message box 250. For example, a keyword 274, "pre-approved", is displayed in the status field 272. The sender 32 first inspects the keyword 274 in the status field 272 to determine if his/her name has already been included in the allowed sender list 57 of FIG. 1. If the words, "Pending, the message may not be deliverable." appear in the second mail header 270, the sender 32 is reminded to seek an authorized-to-reply key 20 before the message is composed and sent. A question mark 276, "?", is a link pointing to a help menu comprising a plurality of instructions for getting the authorized-to-reply key 20 and other information helpful to the sender 32.

The second header 270 is overridden by the sender 32 with a newly acquired authorized-to-reply key 20 which is delivered by the server 10.

A third mail header 280 displays the authenticity level 282 of the mail 36. The mail server 10 authenticates the mail 36 and provides the user 12 a degree of confidence about the mail 36. This header 280 is useful for the mail reader to understand the status of the mail from the sender 32. The possible flags in the third mail header 280 are, (1) "confirmed": a replied mail carrying an authorized-to-reply key 20 given in a previous correspondence by the mail user 12.

(2) "allowed list": the sender's name is registered in the allowed sender list 57.

(3) "passed": an unknown sender who has successfully requested an authorized key for the permission to contact the mail user 12.

(4) "failed": an unknown sender, who has sent the mail without an authorized key, or an invalid key has been given in the mail 36.

(5) "spam": the mail is likely to be a spam.

The sender 32 inserts a returned authorized coded key 284 into a fourth mail header 290 which has a label called "authorized-to-reply key" 292, so that the user 12 would be able to reply to the mail 36 without having to seek an authorized access key to reply to the mail 36. Alternatively, a returned authorized-to-reply password key 20 is usually automatically inserted into the fourth header 290 by the sender's mail system 40 before the mail 36 is sent to the user 12.

A symbol 300 shows the status of the operations command flag 28 which can be modified by user 12. The operations command flag 28 has, besides the "on" and "off" states, included a rebuild indicator 302. When the master database 80 is corrupted, or its content is inadvertently disclosed or compromised, the mail server system 10 in the rebuild mode would work quietly by re-generating new sets of password keys, with minimum impact to the user 12. The remote mail systems are notified of the new authorized password keys. For security reason, it may be better to re-generate all the password keys periodically, or at a set interval chosen by the user 12 in a security-demanding environment. These password keys can indeed become a set of constantly changing dynamic keys for mail exchanges between the mail systems.

Based on the description of the invention and its preferred modes of operation in sufficient detail as shown above, it will be obvious to those of normal skill in the art to make certain changes and variation in the specific elements of the disclosed embodiments without departing from the scope of the invention. It is clear that the foregoing disclosure is merely an illustration of the principles of the present invention. Numerous alternatives, modifications and additions, apparent to those skilled in the art, may be made without deviating from the spirit and broader aspects of this invention as defined in the appended claims.

What is claimed is:

1. A mail server system using a method for processing electronic mails, including sorting and blocking spam mails, comprising:
    a) a device for generating a plurality of passwords which are comprised of a plurality of characters and numbers;
    b) a first password field containing an authorized-to-reply key generated by said device for generating passwords, said authorized-to-reply key is uniquely identifiable by said mail server system and assigned specifically to a mail address of a sender;
    c) a second password field containing a permission-to-transmit key delivered by a remote mail server to a mail user of the said mail server system when said permission-to-transmit key is required for depositing a mail with the said remote mail server; and
    d) an operations command flag for entering into an anti-spam state when said command flag is turned on, and for generating automatically at least a new authorized-to-reply key to replace said authorized-to-reply key at a time interval when desired by said mail user in a security-demanding environment;
    wherein said authorized-to-reply key is required to designate an incoming mail from said sender as a non-spam mail when said operations command flag is enabled by said mail user; said mail server system transmits an authorization packet having a plurality of password keys which is comprised of at least the said authorized-to-reply key and the said permission-to-transmit key to said remote mail server; said mail server system accepts incoming mails having a plurality of master passwords, said master passwords are distributed to friendly senders for the permission to send mails to said mail user, each said master password is automatically replaced in all subsequent mail delivery by a new authorized-to-reply key generated by said device for generating passwords, said authorized-to-reply key is uniquely defined for each sender, and said remote mail server system optionally deletes said master password for security reasons after receiving said authorized-to-reply key from said mail server system.

2. The method of claim 1, wherein said authorized-to-reply key and the said permission-to-transmit key contained in said authorization packet of an outbound mail from said mail user are arranged consecutively in a sequential order in their password positions, whereas the said authorized-to-reply key and the said permission-to-transmit key in an incoming mail to said user have swapped their positions resulting in a reversed order, with the first password position having the said permission-to-transmit key and the second password position containing the said authorized-to-reply key, for probing said mail server system to accept said incoming mail by using the key residing in the said second password position.

3. The method of claim 1, wherein said authorized-to-reply key comprises a first component and a second component, said first component is a unique group name for sorting incoming mails into a plurality of different groups, and said second component is uniquely identifiable and assigned to each mail sender.

4. The method of claim 1, wherein a plurality of mails is sorted and identified by a plurality of icons and identifiers in a separate column provided by the said mail server system.

5. The method of claim 1, wherein said mail server system comprises a challenge-response examination and an issuance of said authorized-to-reply key after the receipt of the correct answers to a plurality of questions presented to said sender.

6. The method of claim 1, wherein the e-mail address of said remote mail server is comprised of several sub-domain names identifiable by domain levels separated by a dot-separator, ".", a plurality of mails originating from said remote mail server is blocked at a desired domain level elected by said mail user.

7. The method of claim 1, wherein a mail header of said mail comprises said password keys having at least the said authorized-to-reply key and the said permission-to-transmit key.

8. The method of claim 1, further comprising a data packet having a plurality of channels, wherein a shopping list is presented by said user in a user-community based search environment among a plurality of mail users for the matching and solicitation of the services and the advertisements which are indicated by the status of the data in the said channels.

9. The method of claim 1, wherein an authenticity level is assigned to said incoming mail to indicate a degree of confidence in said incoming mail, the authenticity of said incoming mail is indicated by at least an allowed list, a web registration by an unknown sender, an authorized-to-reply key and an invalid access key.

10. The method of claim 1, further comprising a data packet to indicate if a payment is required when a specific service is delivered.

11. A mail server system using a method for processing electronic mails, including sorting and blocking spam mails, comprising:
    a) a device for generating a plurality of passwords which are comprised of a plurality of characters and numbers;
    b) a first password field containing an authorized-to-reply key generated by said device for generating passwords, said authorized-to-reply key is uniquely identifiable by said mail server system and assigned specifically to a mail address of a sender;
    c) a second password field containing a permission-to-transmit key delivered by a remote mail server to a mail user of the said mail server system when said permission-to-transmit key is required for depositing a mail with the said remote mail server;

d) an operations command flag for entering into an anti-spam state when said command flag is turned on, and for generating automatically at least a new authorized-to-reply key to replace said authorized-to-reply key at a time interval when desired by said mail user in a security-demanding environment; and e) an authorization packet comprising of at least the said authorized-to-reply key and the said permission-to-transmit key arranged consecutively in a sequential order in an outbound mail from said mail user; said authorized-to-reply key and the said permission-to-transmit key have swapped their positions in an incoming mail to the said user for probing said mail server system to accept said incoming mail by using the key residing in a specific position of the said authorization packet;

wherein said authorized-to-reply key is required to designate an incoming mail from said sender as a non-spam mail when said operations command flag is enabled by said mail user.

12. The method of claim 11, wherein said mail server system accepts incoming mails having a plurality of master passwords, said master passwords are distributed to friendly senders for the permission to send mails to said mail user, each said master password is automatically replaced in all subsequent mail delivery by a new authorized-to-reply key generated by said device for generating passwords password generator, said authorized-to-reply key is uniquely defined for each sender, said remote mail server system deletes said master password for security reasons after receiving said authorized-to-reply key from said mail server system.

13. The method of claim 11, wherein said authorized-to-reply key comprises a first component and a second component, said first component is a unique group name for sorting incoming mails into a plurality of different groups, and said second component is uniquely identifiable and assigned to each mail sender.

14. The method of claim 11, wherein said mail server system comprises a challenge-response examination and an issuance of said authorized-to-reply key after the receipt of the correct answers to a plurality of questions presented to said sender.

15. The method of claim 11, further comprising a data packet having a plurality of channels, wherein a shopping list is presented by said user in a user-community based search environment among a plurality of mail users for the matching and solicitation of the services and the advertisements which are indicated by the status of the data in the said channels.

16. A mail server system using a method for processing electronic mails, including a search and match operation to match desirable resources-sharing services and advertisements while eliminating un-solicited spam mails, comprising:

a) a device for generating a plurality of passwords which are comprised of a plurality of characters and numbers;

b) a first password field containing an authorized-to-reply key generated by said device for generating passwords, said authorized-to-reply key is uniquely identifiable by said mail server system and assigned specifically to a mail address of a sender;

c) a second password field containing a permission-to-transmit key delivered by a remote mail server to a mail user of the said mail server system when said permission-to-transmit key is required for depositing a mail with the said remote mail server;

d) a first data packet comprising a plurality of channels which comprise a plurality of data bits; and e) a shopping list presented by said user for matching and solicitation in a search environment among a plurality of mail users comprising a short description of services and advertisements, with the availability of the services and advertisements represented by the status of the data in said channels;

wherein a channel in the said first data packet is turned on by said mail user to indicate an interest in the specific services and advertisements associated with said channel; said mail user is notified when said mail server finds a match between said services and advertisements and those from said remote mail server; said mail server system transmits an authorization packet having a plurality of password keys which is comprised of at least the said authorized-to-reply key and the said permission-to-transmit key for retrieving a shopping list from said remote mail server: said mail server system accepts incoming mails having a plurality of master passwords, said master passwords are distributed to friendly senders for the permission to send mails to said mail user, each said master password is automatically replaced in all subsequent mail delivery by a new authorized-to-reply key generated by said device for generating passwords, said authorized-to-reply key is uniquely defined for each sender, and said remote mail server system optionally deletes said master password for security reasons after receiving said authorized-to-reply key from said mail server system.

17. The method of claim 16, wherein said authorized-to-reply key and the said permission-to-transmit key contained in said authorization packet of an outbound mail from said mail user are arranged consecutively in a sequential order in their password positions, whereas the said authorized-to-reply key and the said permission-to-transmit key in an incoming mail to said user have swapped their positions resulting in a reversed order, with the first password position having the said permission-to-transmit key and the second password position containing the said authorized-to-reply key, for probing said mail server system to accept said incoming mail by using the key residing in the said second password position.

18. The method of claim 16, wherein said mail server system comprises a challenge-response examination for directing a plurality of questions to an interested party, and an issuance of said authorized-to-reply key after the receipt of the correct answers to said questions.

19. The method of claim 16, further comprising a second data packet containing a plurality of data bits to indicate payment information; wherein a payment is required when a data bit in the said second data packet corresponding to a specific service rendered by said user is turned on.

20. The method of claim 16, wherein an authenticity level is assigned to said incoming mail to indicate a degree of confidence in said incoming mail, the authenticity of said incoming mail is indicated by at least an allowed list, a web registration by an unknown sender, an authorized-to-reply key and an invalid access key.

* * * * *